(12) United States Patent
Korman et al.

(10) Patent No.: US 11,310,164 B1
(45) Date of Patent: Apr. 19, 2022

(54) METHOD AND APPARATUS FOR RESOURCE ALLOCATION

(71) Applicant: Marvell Israel (M.I.S.L) Ltd., Yokneam (IL)

(72) Inventors: Liat Korman, Petah-Tikva (IL); Yaniv Azulay, Nes-Ziona (IL); Lev Vaskevich, Herzeliya (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 95 days.

(21) Appl. No.: 16/512,129

(22) Filed: Jul. 15, 2019

Related U.S. Application Data (60) Provisional application No. 62/712,811, filed on Jul. 31, 2018.

(51) Int. Cl.
*H04L 12/863* (2013.01)
*H04L 12/927* (2013.01)
*H04L 12/865* (2013.01)

(52) U.S. Cl.
CPC ...... *H04L 47/6225* (2013.01); *H04L 47/6215* (2013.01); *H04L 47/6275* (2013.01); *H04L 47/808* (2013.01)

(58) Field of Classification Search
CPC ............... H04L 47/6225; H04L 47/808; H04L 47/6215; H04L 47/6275
See application file for complete search history.

(56) References Cited

U.S. PATENT DOCUMENTS

| 6,011,798 A * | 1/2000 | McAlpine | H04L 12/5601 370/395.42 |
| 6,449,253 B1 * | 9/2002 | Ott | H04L 12/5602 370/231 |
| 2003/0179774 A1 * | 9/2003 | Saidi | H04L 47/525 370/468 |
| 2003/0182517 A1 * | 9/2003 | Gooch | G06F 13/1673 711/150 |
| 2017/0251077 A1 * | 8/2017 | Eerpini | H04L 47/6215 |
| 2020/0328983 A1 * | 10/2020 | Liu | H04W 28/24 |

* cited by examiner

*Primary Examiner* — Sharmin Chowdhury (57) ABSTRACT

A network device includes queues for queuing packets, and functional circuitry to provide a processing resource to be shared by the queues. Further, the network device includes a first-in-first-out (FIFO) selection circuit that receives tokens respectively associated with the queues. The FIFO selection circuit buffers and outputs the tokens in a first-in-first-out manner. When a token is output by the FIFO selection circuit, a queue associated with the token is selected to provide a packet for the functional circuitry to process. When a queue associated with an output token having at least a second packet in the queue after the queue outputs a first packet, the FIFO selection circuit re-buffers the output token associated with the queue to permit the queue to output the second packet once the output token associated with the queue is again output by the FIFO selection circuit.

20 Claims, 7 Drawing Sheets

METHOD AND APPARATUS FOR RESOURCE ALLOCATION

INCORPORATION BY REFERENCE

This present disclosure claims the benefit of U.S. Provisional Application No. 62/712,811, "FIRST-IN FIRST-OUT (FIFO) BASED PSEUDO ROUND ROBIN (RR) ARBITER" filed on Jul. 31, 2018, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In various examples, resources, such as memory space, storage devices, computing devices, communication links, network bandwidth, multimedia data, information files, and the like are shared by multiple users (or clients). To share a resource, generally, a resource allocation arbiter determines the assignment of the resource to the users using an algorithm, such as round robin algorithm.

SUMMARY

Aspects of the disclosure provide methods and apparatuses for resource allocation. In some examples, a network device includes a plurality of queues that respectively queue packets for processing, and functional circuitry to provide a processing resource to be shared by the plurality of queues for processing the packets in the plurality of queues. Further, the network device includes a first-in-first-out (FIFO) selection circuit. The FIFO selection circuit receives tokens respectively associated with the plurality of queues. A token associated with a queue is indicative of a selection of the queue for providing a packet to be processed by the functional circuitry when the token is output by the FIFO selection circuit. The FIFO selection circuit further buffers and outputs the tokens in a first-in-first-out manner. In response to a first queue of the plurality of queues, associated with an output token having at least a second packet in the first queue after the first queue outputs a first packet for processing by the functional circuitry as indicated by the output token, the FIFO selection circuit re-buffers the output token associated with the first queue to permit the first queue to output the second packet once the output token associated with the first queue is again output by the FIFO selection circuit.

In some examples, the FIFO selection circuit includes a multi-write FIFO buffer configured to, in a clock cycle, receive multiple input tokens and add the multiple input tokens into a token list after a tail of the token list. Further, the multi-write FIFO buffer is configured to, in the clock cycle, remove a token from a head of the token list and output the removed token in response to a read access to the multi-write FIFO buffer.

In some embodiments, the FIFO selection circuit includes a logic circuit configured to generate an initial token associated with the first queue in response to a request from the first queue for requesting the processing resource. In an example, the logic circuit stores a status of the first queue and updates the status in response to the output token. Further, the logic circuit determines, based on the status of the first queue, whether the output of the first packet in response to the output token fulfills the request from the first queue associated with the output token; and writes the output token into the multi-write FIFO buffer when the output of the first packet in response to the output token fails to fulfill the request from the first queue associated with the output token.

In some embodiments, the FIFO selection circuit includes a logic circuit configured to monitor the queues, and generate an initial token associated with the first queue in response to a status of the first queue changing from empty to non-empty. Then, the logic circuit is configured to determine, based on the status of the first queue, whether the first queue changes the status to empty after the first queue outputs the first packet in response to the output token; and write the output token into the multi-write FIFO buffer when the first queue remains non-empty after the first queue outputs the first packet in response to the output token.

In some embodiments, the FIFO selection circuit includes a plurality of FIFO buffers of different priority levels, and a logic circuit. The logic circuit is configured to write a token associated with a queue to one of the FIFO buffers that matches a priority of the queue, and select one of the FIFO buffers to provide the output token in a cycle according a priority based arbitration algorithm.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Aspects of the disclosure provide a resource arbiter for scheduling allocation of a shared resource for serving clients (e.g. client devices). The resource arbiter is based on a first-in-first-out (FIFO) scheduling technique to implement a pseudo round robin (RR) algorithm. Generally, a round robin algorithm assigns shares of the resource (e.g., time slices, and the like) to clients in equal portions and in a circular order. The resource arbiter, in accordance with an embodiment, includes a FIFO selection circuit. The FIFO selection circuit receives tokens respectively associated with clients who request the shared resource. A token associated with a client is indicative of an allocation of the shared resource to the client when the token is output by the FIFO selection circuit. Then, the FIFO selection circuit buffers and outputs the tokens in a first-in-first-out manner. The FIFO selection circuit selectively re-buffers an output token associated with a client when the client requires an additional resource allocation of the shared resource in excess of the allocation in response to the output token.

Figure 1:
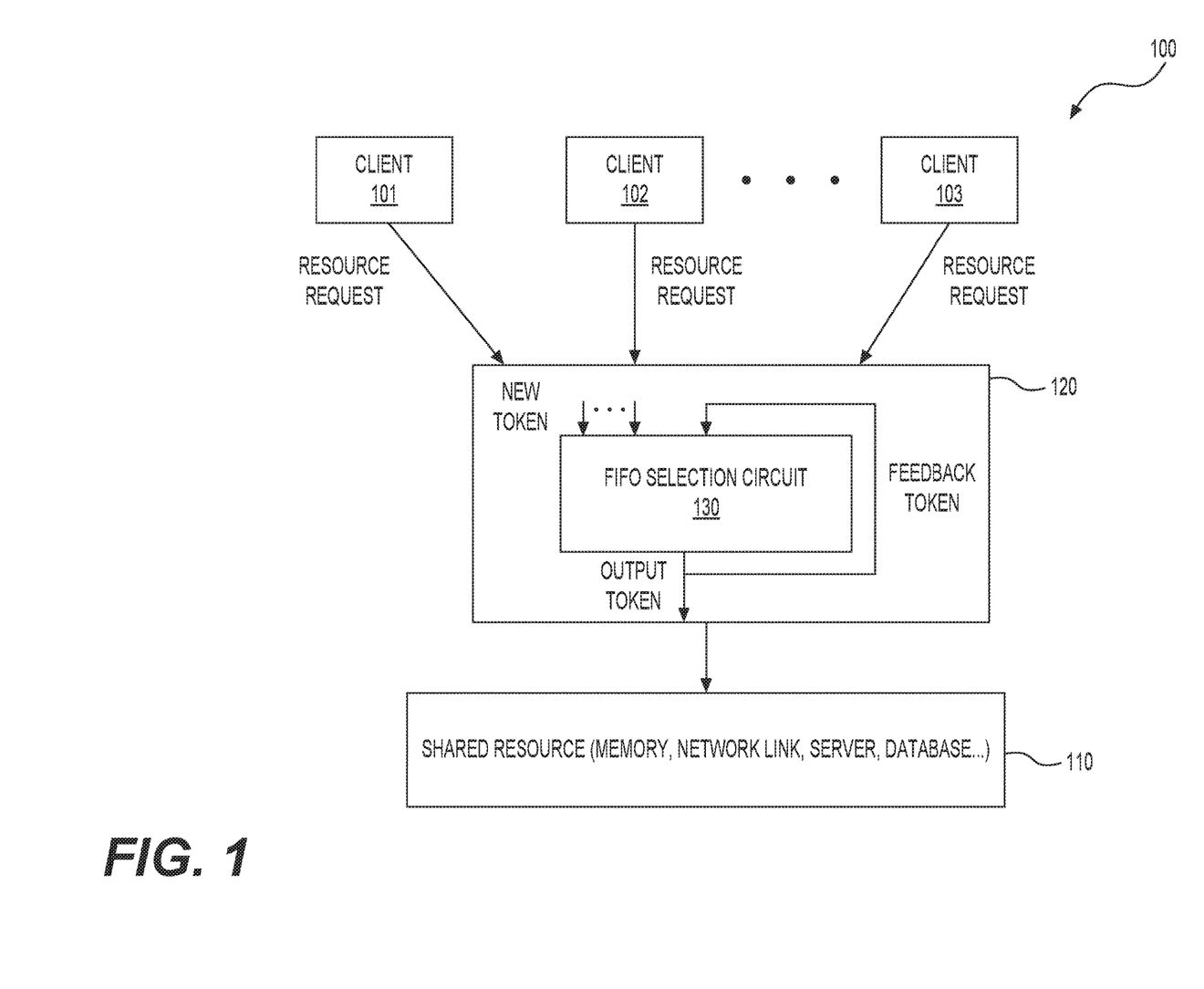
FIG. 1 shows a block diagram for a resource allocation system 100 that is based on first-in-first-out (FIFO) scheduling techniques according to an embodiment of the disclosure.

FIG. 1 shows a block diagram for a resource allocation system 100 that is based on a first-in-first-out (FIFO) scheduling technique according to an embodiment of the disclosure. The resource allocation system 100 includes a resource 110 (designated as "shared resource 110" in FIG. 1) that is shared by a plurality of clients 101-103. The resource allocation system 100 includes a resource arbiter 120 to allocate the resource 110 in response to resource requests from the plurality of clients 101-103. The resource arbiter 120 is based on FIFO scheduling technique to implement a pseudo round robin algorithm.

The resource allocation system 100 can be any suitable system, and the resource 110 can be any suitable resource. In an example, the resource allocation system 100 is a network switch device, and the resource 110 is a network switch resource, such as a communication link, transmission hardware, a forwarding database, a policy engine, and the like that support transmission of packets from a plurality of packet queues that are represented by the clients 101-103 in FIG. 1. In another example, the resource allocation system 100 is a cloud computing system, and the resource 110 is a processor that performs computation tasks from multiple users that are represented by the clients 101-103 in FIG. 1. In another example, the resource allocation system 100 is a multimedia streaming system, and the resource 110 is a multimedia streaming server that provides multimedia streams to multimedia terminal devices that are represented by the clients 101-103 in FIG. 1. In another example, the resource allocation system 100 is a base station system or access point system in a wireless communication network, and the resource 100 corresponds to communication bandwidth and/or time allocated to wireless clients for communication within the wireless communication network.

In some examples, the resource 110 is allocated in the form of allocation units, such as time slices, bandwidth divisions, and the like. In an example, the allocation units have equal values. In another example, the allocation units are weighted of different values.

It is noted that while three clients 101-103 are depicted in the FIG. 1 example, the resource allocation system 100 can allocate resource to any suitable number of clients.

In the FIG. 1 example, when a client, for example the client 101, requires a service from the shared resource 110, the client 101 sends a resource request to the resource arbiter 120. The resource request includes suitable information of the client 101 and the requested resource. For example, the resource request includes an identification of the client 101, an amount of the requested resource, and the like. In response to the resource request from the client 101, in an example, the resource arbiter 120 generates a token associated with the client 101. For example, the token includes the identification of the client 101. In some embodiments, the token also includes information of the amount of requested resource. For example, the token includes the amount of requested resource in the form of a number of serving units, such as the allocation units.

In the FIG. 1 example, the resource arbiter 120 includes a FIFO selection circuit 130, and the FIFO selection circuit 130 buffers tokens in a first-in-first-out manner. In some examples, the FIFO selection circuit 130 operates based on a clock, such as a servicing clock. For example, a clock cycle of the servicing clock corresponds to a time slice for resource allocation. In one embodiment, the FIFO selection circuit 130 is configured to support multiple write accesses and a single read access to a buffer (e.g., FIFO buffer) in a same clock cycle. For example, the FIFO buffer stores a list of tokens between a head and a tail according to the time the tokens are received. The token at the head is received earlier than the rest of any other tokens in the list, and the token at the tail is last received. When a write access is performed, a new token is added after the current tail and the new token becomes a new tail for the list of tokens. When a read access is performed, the token at the head is removed and output, and the next token after the head in the list becomes a new head for the list of tokens. In an example, in a clock cycle, when the FIFO selection circuit 130 receives multiple input tokens, the FIFO selection circuit 130 writes the multiple input tokens into the FIFO buffer after the tail of the list of tokens. In the same clock cycle, when the FIFO selection circuit 130 performs a read access to the list of tokens, the head of the list of tokens is read, and output from the FIFO buffer. When a token is output by the FIFO selection circuit 130, the resource 110 is allocated to the client associated with the token for a clock cycle of the servicing clock in an example.

According to an aspect of the disclosure, an output token is conditionally fed back and re-buffered by the FIFO selection circuit 130. For example, when the resource allocation in the clock cycle satisfies the resource request from the client (a total of the resource allocation in the clock cycle and in previous clock cycles is equal to or larger than the amount of requested resource in the resource request), then the output token is not fed back; and when the client requires additional resource allocation in excess of the resource allocation associated with the output token, the output token is fed back and re-buffered by the FIFO selection circuit 130.

According to an aspect of the disclosure, the feedback of the output token for re-buffering has very small delay, and thus an output token is able to be written back in the FIFO buffer in a next clock cycle of the servicing clock, for example. Then, the token can be output in the next cycle when the list has no other tokens. Thus, FIFO selection circuit 130 enables back-to-back (back2back) allocation that is used to refer consecutive allocations to a same client (allocating the resource to a same client in consecutive clock cycles). Consequently, a client does not have to subsequently send a resource request to a resource arbiter (e.g., resource arbiter 120) in order to again receive access to a resource. Such a resource request can take few to many clock cycles in duration e.g., such as in an embodiment when a multiplexer circuit is implemented to select a client from a plurality of clients for resource allocation as described below.

In a related example, a multiplexer circuit is used to select a client from a plurality of clients for resource allocation. In one embodiment, the multiplexer circuit has a limitation that supports a maximum of 30 clients for example. When the number of clients is greater than 30 in an example, multiple multiplexer circuits are cascaded into multiple layers. The cascaded multiplexers have relatively large delay, and are not able to support back-to-back allocation. Circuits and systems other than a multiplexer circuit may be used to select a client from a plurality of clients for resource allocation, and in such cases, such systems might also not support back-to-back allocation.

According to an aspect of the disclosure, the FIFO selection circuit 130 supports large number of clients and back-to-back allocation. For example, when the maximum number of clients is determined, the size of the FIFO buffer is configured to be the maximum number of clients. Further, the feedback delay does not depend on the FIFO buffer size, thus the FIFO selection circuit 130 still enables back-to-back allocation.

As mentioned above, the resource allocation system 100 can be any suitable system that shares a resource with multiple clients. While following description and Figures use network devices as examples, the description can be suitably modified for other suitable resource allocation system.

Figure 2:
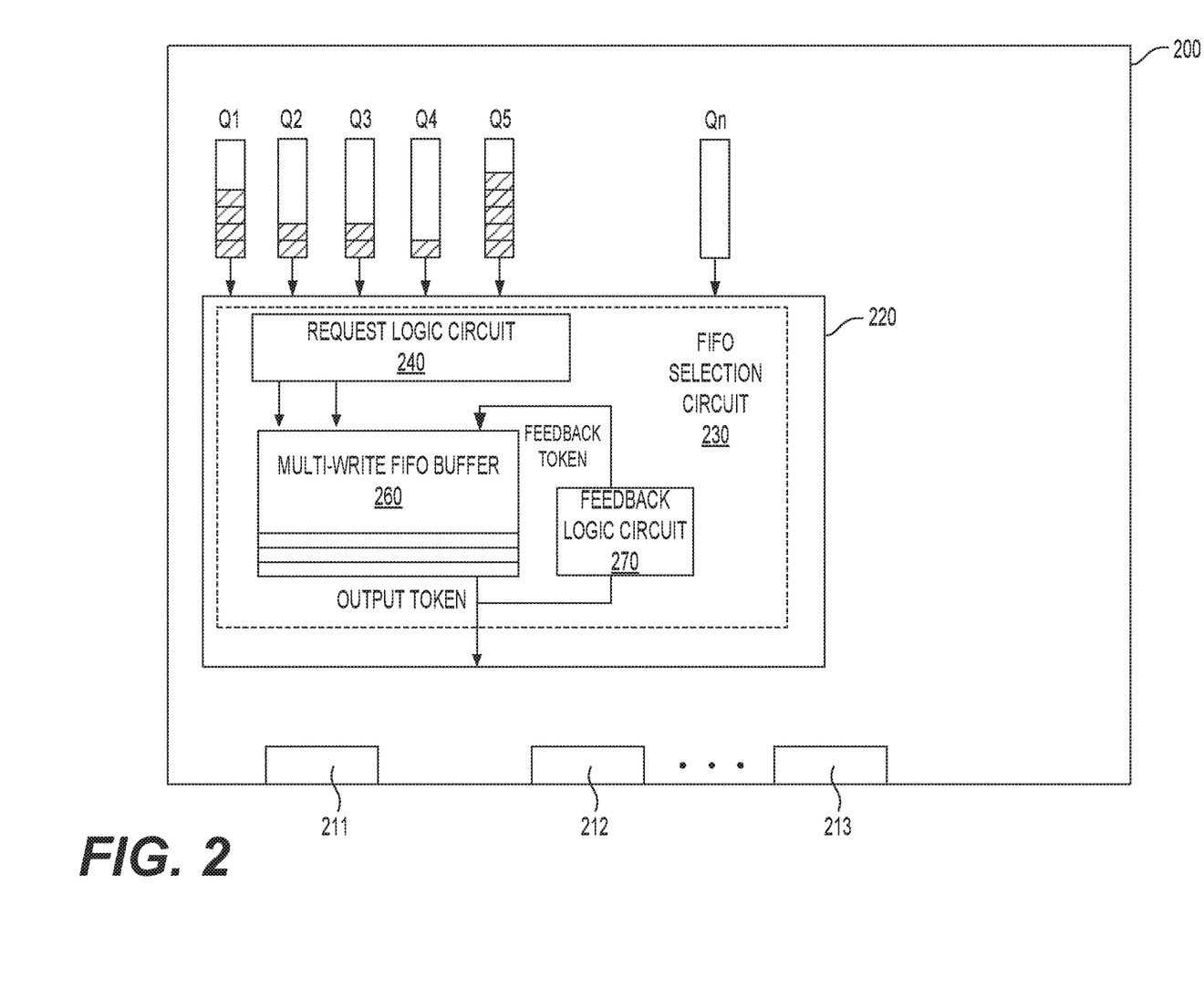
FIG. 2 shows a block diagram of a network device 200 as an implementation of the resource allocation system 100 according to an embodiment of the disclosure.

FIG. 2 shows a block diagram of a network device 200 as an implementation of the resource allocation system 100 according to an embodiment of the disclosure. The network device 200 includes an arbitrator 220 configured to manage allocation of network transmission resource to a plurality of packet queues Q1-Qn. The arbitrator 220 is based on a FIFO scheduling technique to implement a pseudo round robin (RR) algorithm.

According to an aspect of the disclosure, the network device 200 is a suitable network device, such as a network switch, a bridge, a router, a VPN concentrator, and the like that connects two or more computer systems, network segments, subnets, and so on. It is noted that the network device 200 is not necessarily limited to a particular protocol layer or to a particular networking technology (e.g., Ethernet). In an example, the network device 200 is implemented on an integrated circuit (IC) chip using a system on a chip (SOC) technology. In another example, the network device 200 is implemented using multiple IC chips, and the multiple IC chips are coupled together in an IC package, by way of silicon interposers or on a printed circuit board (PCB) for example.

The network device 200 includes various functional circuit blocks, such as network ports 211-213 with transmission hardware, packet processing circuitry (not shown), a forwarding database (not shown), a policy engine (not shown), packet queues (e.g., packet queues Q1-Qn), the arbiter 220, and the like coupled together for example using suitable interconnection architecture (not shown), such as a bus architecture.

In some examples, packet processing requests various processing resources, such as forwarding database, a policy engine, transmission hardware, and the like. The following description of resource allocation uses transmission hardware as an example, and the description can be suitably modified for other processing resources.

In the FIG. 2 example, packets to be sent out of the network port 211 are queued in the packet queues Q1-Qn according to respective packet information. In an example, the packet queues Q1-Qn are configured to queue packets according to priorities of the packets. For example, the packet queue Q1 is assigned with the highest priority, and the packet queue Qn is assigned with the lowest priority. When a packet has the highest priority, the packet is queued in the packet queue Q1, and when a packet has the lowest priority, the packet is queued in the packet queue Qn. It is noted that, the packets can be queued into the packet queues Q1-Qn according to other suitable packet information, such as protocol information, and the like.

According to an aspect of the disclosure, the packet queues Q1-Qn share the transmission resource of the network port 211, and the arbiter 220 determines which queue from the packet queues Q1-Qn gains access to the network port 211 in each time slice to transmit packet(s) in the queue. In some examples, a time slice is suitably determined for transmitting one packet of a size limit and the packets are suitably sized (e.g., by fragmentation and the like) not to exceed the size limit.

It is noted that in some embodiments, the packet queues Q1-Qn queue packets themselves. In some other embodiments, the packet queues Q1-Qn queue packet descriptors associated with the packets rather than queuing the packets themselves. A packet descriptor includes some information from the packet, such as some or all of the header information of the packet, and/or includes information generated for the packet, in an embodiment. In some embodiments, the packet descriptor includes other information as well such as an indicator of where the packet is stored in a memory. For ease of explanation, the term "packet" herein is used to refer to a packet itself or to a packet descriptor associated with the packet.

In the FIG. 2 example, the arbiter 220 includes a FIFO selection circuit 230. The FIFO selection circuit 230 further includes a multi-write FIFO buffer 260, a request logic circuit 240 and a feedback logic circuit 270 coupled together for example as shown in FIG. 2.

The request logic circuit 240 is configured to generate tokens in response to requests (e.g., request signals) from the packet queues Q1-Qn. For example, each of the packet queues Q1-Qn is configured to send a request when the status of the packet queue changes from empty to non-empty. In an example, when a packet queue has a status change from empty to non-empty, the request logic circuit 240 generates a token associated with the packet queue. For example, when the packet queue Q1 changes from empty to non-empty, the request logic circuit 240 generates a token Q1 that is associated with the packet queue Q1. In another example, when the packet queues Q1-Q5 change from empty to non-empty, and the request logic circuit 240 generates five tokens Q1-Q5. The token Q1 is associated with the packet queue Q1, the token Q2 is associated with the packet queue Q2, the token Q3 is associated with the packet queue Q3, the token Q4 is associated with the packet queue Q4, and the token Q5 is associated with the packet queue Q5.

It is noted that, in some embodiments, the packet queues do not send requests, and the request logic circuit 240 monitors the statuses of the packet queues Q1 and Qn, and generates tokens in response to status changes.

In some embodiments, a token also includes a number that is indicative of the number of packets in the associated packet queue. For example, the packet queue Q1 queues four packets as shown in FIG. 2, and then the token Q1 includes a numeral 4 which corresponds to the number of packets in the packet queue Q1; the packet queue Q2 queues two packets as shown in FIG. 2, and then the token Q2 includes a numeral 2 which corresponds to the number of packets in the packet queue Q2; the packet queue Q3 queues two packets, and then the token Q3 includes a numeral 2 which corresponds to the number of packets in the packet queue Q3; the packet queue Q4 queues one packet, and then the token Q4 includes 1 which corresponds to the number of packet in the packet queue Q4; the packet queue Q5 queues five packets, and then the token Q5 includes a numeral 5 which corresponds to the number of packets in the packet queue Q5.

In some embodiments, the request logic circuit 240 writes tokens to the multi-write FIFO buffer 260 in an order according to certain arbitration scheme. In an example, the request logic circuit 240 is able to write two tokens into the multi-write FIFO buffer 260 in a clock cycle. When the request logic circuit 240 generates more than two tokens in a clock cycle, the request logic circuit 240 writes the two tokens that are associated with packet queues having the highest priority into the multi-write FIFO buffer 260. The request logic circuit 240 writes the rest of the tokens into the multi-write FIFO buffer 260 in the subsequent clock cycles.

The multi-write FIFO buffer 260 is configured to buffer tokens that are written into the buffer into a token list, and provide an output token in response to a read in a first-in-first-out manner. In some embodiments, the token list includes a sequence of tokens from a head to a tail. When a token is written into the token list, the token is added after the current tail and becomes a new tail of the token list. In response to a read access, the token at the head is removed and output, and the next token to the head becomes a new head of the token list.

In some embodiments, the multi-write FIFO buffer 260 has two or more inputs, and one of the inputs is the output token that is selectively input by the feedback logic circuit 270. In the FIG. 2 example, the multi-write FIFO buffer 260 is configured to receive two writes from the request logic circuit 240 and one write from the feedback logic circuit 270. The request logic circuit 240 provides new tokens, and the feedback logic circuit 270 provides feedback token corresponding to the output token. The multi-write FIFO buffer 260 buffers the new tokens and the feedback token into the token list according to certain order. In an example, the multi-write FIFO buffer 260 buffers the new tokens first, and then the feedback token. In another example, the multi-write FIFO buffer 260 buffers the feedback token first and then the new tokens.

In some embodiments, when the multi-write FIFO buffer 260 provides an output token, then the packet queue associated with the output token is enabled to provide a packet to the network port 211 to transmit out of the network device 200. The output token is also provided to the feedback logic circuit 270. The feedback logic circuit 270 then selectively provides a feedback token based on the output token. In an embodiment, the feedback logic circuit 270 determines whether the packet queue associated with the output token is empty (after the transmission of packet in response to the output token). When the packet queue associated with the output token is empty, then no feedback token is provided; otherwise, the feedback logic circuit 270 provides the feedback token to be re-buffered into the multi-write FIFO buffer 260.

In an example, a token associated with a packet queue includes a number that is indicative of a number of packets in the packet queue. When the feedback logic circuit 270 receives an output token, the feedback logic circuit 270 updates the number in the output token (e.g., deduct by 1), then the feedback logic circuit 270 determines whether the packet queue associated with the output token is empty based on the number in the output token. When the number is zero, no feedback token is provided; when the number is still larger than zero, the feedback logic circuit 270 provides the output token as the feedback token to be re-buffered into the multi-write FIFO buffer 260.

Figure 3:
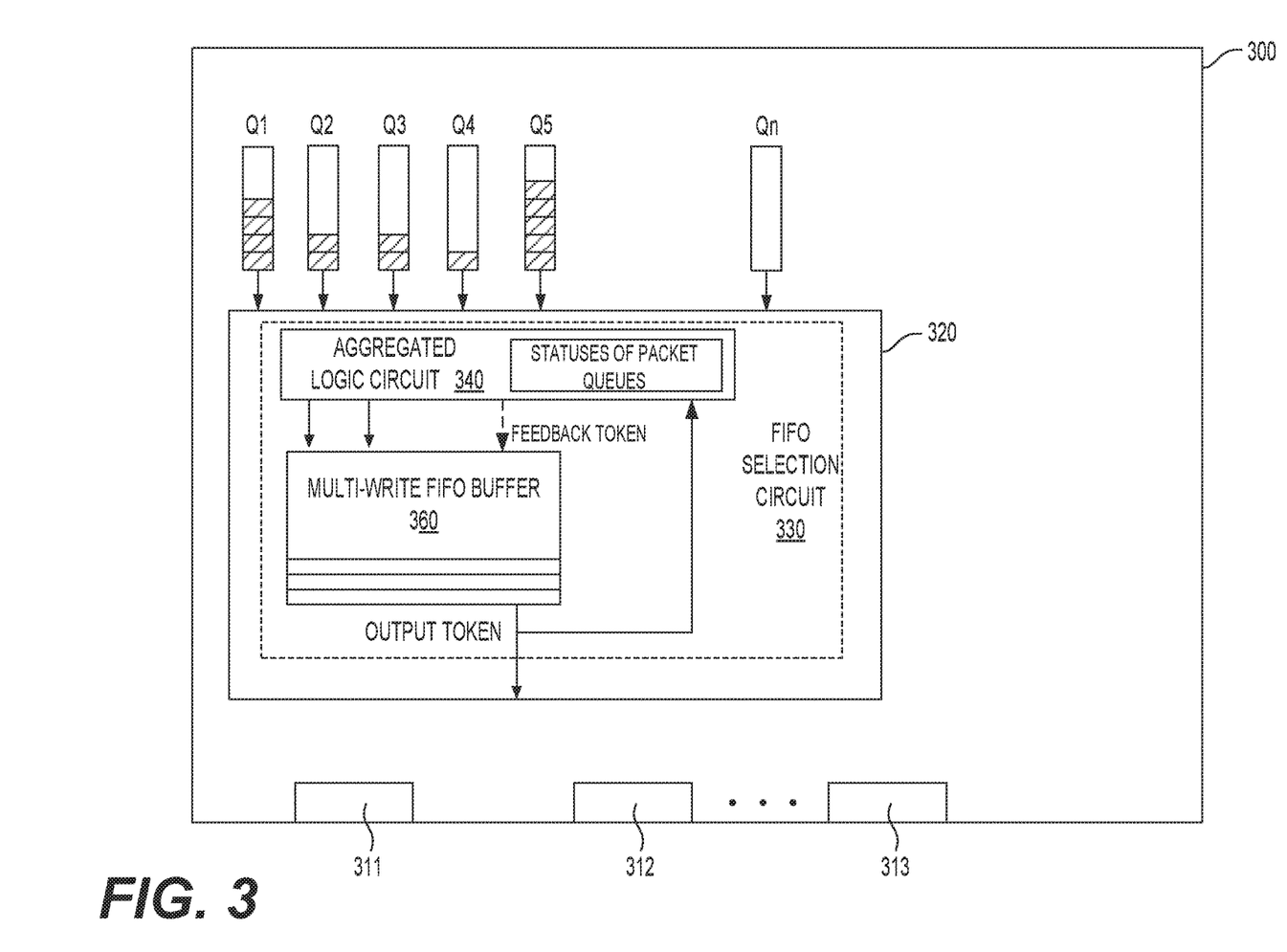
FIG. 3 shows a block diagram of another network device 300 as an implementation of the resource allocation system 100 according to an embodiment of the disclosure.

FIG. 3 shows a block diagram of another network device 300 as an implementation of the resource allocation system 100 according to an embodiment of the disclosure. The network device 300 includes an arbitrator 320 configured to manage allocation of network transmission resource to a plurality of packet queues Q1-Qn. The arbitrator 320 is based on a FIFO scheduling technique to implement a pseudo round robin (RR) algorithm.

The network device 300 utilizes certain components that are identical or equivalent to those used in the network device 200; the description of these components has been provided above and will be omitted here for clarity purposes. For example, the network ports 311-313 are identical or equivalent to the network ports 211-213; the packet queues Q1-Qn in FIG. 3 are identical or equivalent to the packet queues Q1-Qn in FIG. 3, the multi-write FIFO buffer 360 is identical or equivalent to the multi-write FIFO buffer 260.

However, in the FIG. 3 example, the arbiter 320 includes a FIFO selection circuit 330, and the FIFO selection circuit 330 includes the multi-write FIFO buffer 360 and an aggregated logic circuit 340 that includes any suitable supporting logic circuits between the multi-write FIFO buffer 360 and the packet queues Q1-Qn to enable the arbiter operation using the multi-write FIFO buffer 360.

In some embodiments, the aggregated logic circuit 340 is configured to maintain status information of the packet queues Q1-Qn. In some embodiments, the aggregated logic circuit 340 includes registers to store the statuses of the packet queues. In an example, a status of a packet queue is stored in the form of "empty" or "non-empty". In another example, a status of a packet queue is stored in the form of a number of packets in the packet queue. In some examples, the registers are respectively updated according to the corresponding packet queues in each clock cycle.

Further, in some embodiments, the aggregated logic circuit 340 is configured to generate new tokens for writing to the multi-write FIFO buffer 360 in response to statuses of the packet queues Q1-Qn, and is configured to write an output token back to the multi-write FIFO buffer 360 based on the statuses of the packets queues Q1-Qn.

In an embodiment, when a packet queue has a status change from empty to non-empty, the aggregated logic circuit 340 generates a new token associated with the packet queue. For example, when the packet queue Q1 changes from empty to non-empty, the aggregated logic circuit 340 generates a token Q1 that is associated with the packet queue Q1. In another example, when the packet queues Q1-Q5 change from empty to non-empty in a clock cycle, the aggregated logic circuit 340 generates five tokens Q1-Q5. The token Q1 is associated with the packet queue Q1, the token Q2 is associated with the packet queue Q2, the token Q3 is associated with the packet queue Q3, the token Q4 is associated with the packet queue Q4, and the token Q5 is associated with the packet queue Q5.

In another embodiment, when the aggregated logic circuit 340 receives an output token associated with a packet queue, and the packet queue is in the empty status (e.g., changed from non-empty to empty in response to a packet transmission due to the output token), the aggregated logic circuit 340 discards the output token without writing back to the multi-write FIFO buffer 360. However, when the aggregated logic circuit 340 receives an output token associated with a packet queue, and the packet queue is in the non-empty status, the aggregated logic circuit 340 writes the output token back (as a feedback token) into the multi-write FIFO buffer 360.

It is noted that, in the FIG. 3 example, the statuses of the packet queues are tracked by the aggregated logic circuit 340, and thus tokens do not need to track the status of the packet queues, thus do not need to include a number that is indicative of the number of packets in the associated packet queue.

Figure 4:
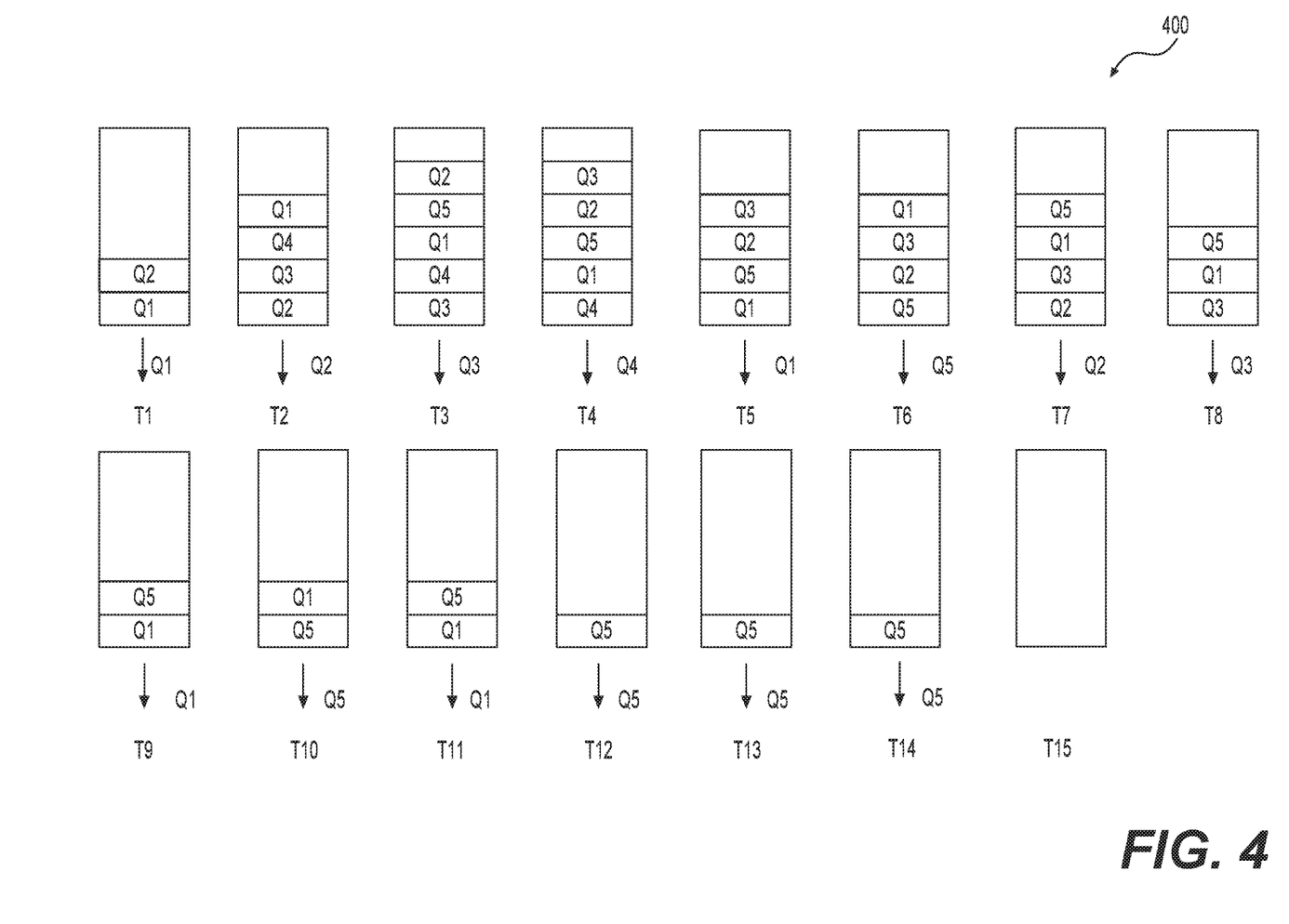
FIG. 4 shows a plot 400 of a FIFO buffer at different times for resource allocation in the network device 200 or in the network device 300 in some examples.

FIG. 4 shows a plot 400 of buffered token list in the multi-write FIFO buffer 260 or in the multi-write FIFO buffer 360 according to an embodiment of the disclosure. The following description uses the multi-write FIFO buffer 360 in the network device 300 as an example, the description can be suitably modified for the multi-write FIFO buffer 260 in the network device 200.

In the FIG. 4 example, the buffered token list at time T1-T15 are shown, and the time T1-T15 correspond to consecutive clock cycles in an example.

For ease of description, the packet queues Q1-Qn are assumed to be empty previously, and just before the time T1, four packets are queued in the packet queue Q1, two packets are queued in the packet queue Q2, two packets are queued in the packet queue Q3, one packet is queued in the packet queue Q4, and five packets are queued in the packet queue Q5. Further, it is assumed that no new packets are queued in the packet queues Q1-Qn during the time duration form time T1 to time T15.

At time T1, in an example, according to the packets queued in the packets queues Q1-Q5, and statuses of the packet queues Q1-Q5 are changed from empty to non-empty. Then, the aggregated logic circuit 340 generates new tokens Q1-Q5. In an example, the packet queues Q1 and Q2 have higher priority than the packet queues Q3, Q4 and Q5, and the packet queues Q3 and Q4 have higher priority than the packet queue Q5. Then, the aggregated logic circuit 340 writes the new token Q1 and Q2 into the multi-write FIFO buffer 360. Thus, the token list from head to tail is Q1-Q2. Further, the multi-write FIFO buffer 360 outputs the token Q1 in response to a read access to the multi-write FIFO buffer 360. In response to the output token Q1, the packet queue Q1 provides a packet to the network port 311 for transmitting out of the network device 300. Then, the packet queue Q1 has three packets, the packet queue Q2 has two packets, the packet queue Q3 has two packets, the packet queue Q4 has one packet, and the packet queue Q5 has five packets.

At time T2, in an example, the aggregated logic circuit 340 receives the output token Q1. Because the status of the packet queue Q1 is still non-empty, the aggregated logic circuit 340 writes the token Q1 with the new tokens Q3 and Q4 into the multi-write FIFO buffer 360. In an example, the new tokens Q3 and Q4 are written into the multi-write FIFO buffer 360 before the token Q1. Thus, the token list from head to tail is Q2-Q3-Q4-Q1. Further, the multi-write FIFO buffer 360 outputs the token Q2 in response to a read access to the multi-write FIFO buffer 360. In response to the output token Q2, the packet queue Q2 provides a packet to the network port 311 for transmitting out of the network device 300. Then, the packet queue Q1 has three packets, the packet queue Q2 has one packet, the packet queue Q3 has two packets, the packet queue Q4 has one packet, and the packet queue Q5 has five packets.

At time T3, in an example, the aggregated logic circuit 340 receives the output token Q2 that was previously output at T2. Because the status of the packet queue Q2 is still non-empty, the aggregated logic circuit 340 writes the token Q2 with the new token Q5 into the multi-write FIFO buffer 360. In an example, the new token Q5 is written into the multi-write FIFO buffer 360 before the token Q2. Thus, the token list from head to tail is Q3-Q4-Q1-Q5-Q2. Further, the multi-write FIFO buffer 360 outputs the token Q3 in response to a read access to the multi-write FIFO buffer 360. In response to the output token Q3, the packet queue Q3 provides a packet to the network port 311 for transmitting out of the network device 300. Then, the packet queue Q1 has three packets, the packet queue Q2 has one packet, the packet queue Q3 has one packet, the packet queue Q4 has one packet, and the packet queue Q5 has five packets.

At time T4, in an example, the aggregated logic circuit 340 receives the output token Q3 that was previously output at T3. Because the status of the packet queue Q3 is still non-empty, the aggregated logic circuit 340 writes the token Q3 into the multi-write FIFO buffer 360. Thus, the token list from head to tail is Q4-Q1-Q5-Q2-Q3. Further, the multi-write FIFO buffer 360 outputs the token Q4 in response to a read access to the multi-write FIFO buffer 360. In response to the output token Q4, the packet queue Q4 provides a packet to the network port 311 for transmitting out of the network device 300. Then, the packet queue Q1 has three packets, the packet queue Q2 has one packet, the packet queue Q3 has one packet, the packet queue Q4 has no packet, and the packet queue Q5 has five packets.

At time T5, in an example, the aggregated logic circuit 340 receives the output token Q4 that was previously output at T4. Because the status of the packet queue Q4 changes to empty (the one packet in the packet queue Q4 has been transmitted in response to the output token Q4), the aggregated logic circuit 340 discard the token Q4 without writing back into the multi-write FIFO buffer 360. Thus, the token list from head to tail is Q1-Q5-Q2-Q3. Further, the multi-write FIFO buffer 360 outputs the token Q1 in response to a read access to the multi-write FIFO buffer 360. In response to the output token Q1, the packet queue Q1 provides a packet to the network port 311 for transmitting out of the network device 300. Then, the packet queue Q1 has two packets, the packet queue Q2 has one packet, the packet queue Q3 has one packet, the packet queue Q4 has no packet, and the packet queue Q5 has five packets.

At time T6, in an example, the aggregated logic circuit 340 receives the output token Q1 that was previously output at T5. Because the status of the packet queue Q1 is still non-empty, the aggregated logic circuit 340 writes the token Q1 back into the multi-write FIFO buffer 360. Thus, the token list from head to tail is Q5-Q2-Q3-Q1. Further, the multi-write FIFO buffer 360 outputs the token Q5 in response to a read access to the multi-write FIFO buffer 360. In response to the output token Q5, the packet queue Q5 provides a packet to the network port 311 for transmitting out of the network device 300. Then, the packet queue Q1 has two packets, the packet queue Q2 has one packet, the packet queue Q3 has one packet, the packet queue Q4 has no packet, and the packet queue Q5 has four packets.

At time T7, in an example, the aggregated logic circuit 340 receives the output token Q5 that was previously output at T6. Because the status of the packet queue Q5 is still non-empty, the aggregated logic circuit 340 writes the token Q5 back into the multi-write FIFO buffer 360. Thus, the token list from head to tail is Q2-Q3-Q1-Q5. Further, the multi-write FIFO buffer 360 outputs the token Q2 in response to a read access to the multi-write FIFO buffer 360. In response to the output token Q2, the packet queue Q2 provides a packet to the network port 311 for transmitting out of the network device 300. Then, the packet queue Q1 has two packets, the packet queue Q2 has no packet, the packet queue Q3 has one packet, the packet queue Q4 has no packet, and the packet queue Q5 has four packets.

At time T8, in an example, the aggregated logic circuit 340 receives the output token Q2 that was previously output at T7. Because the status of the packet queue Q2 is changed to empty (the two packets in packet queues Q2 have been transmitted), the aggregated logic circuit 340 discards the token Q2 without writing back into the multi-write FIFO buffer 360. Thus, the token list from head to tail is Q3-Q1-Q5. Further, the multi-write FIFO buffer 360 outputs the token Q3 in response to a read access to the multi-write FIFO buffer 360. In response to the output token Q3, the packet queue Q3 provides a packet to the network port 311 for transmitting out of the network device 300. Then, the packet queue Q1 has two packets, the packet queue Q2 has no packet, the packet queue Q3 has no packet, the packet queue Q4 has no packet, and the packet queue Q5 has four packets.

At time T9, in an example, the aggregated logic circuit 340 receives the output token Q3 that was previously output at T8. Because the status of the packet queue Q3 is changed to empty (the two packets in packet queue Q3 have been transmitted), the aggregated logic circuit 340 discards the token Q3 without writing back into the multi-write FIFO buffer 360. Thus, the token list from head to tail is Q1-Q5. Further, the multi-write FIFO buffer 360 outputs the token Q1 in response to a read access to the multi-write FIFO buffer 360. In response to the output token Q1, the packet queue Q1 provides a packet to the network port 311 for transmitting out of the network device 300. Then, the packet queue Q1 has one packet, the packet queue Q2 has no packet, the packet queue Q3 has no packet, the packet queue Q4 has no packet, and the packet queue Q5 has four packets.

At time T10, in an example, the aggregated logic circuit 340 receives the output token Q1 that was previously output at T9. Because the status of the packet queue Q1 is still non-empty, the aggregated logic circuit 340 writes the token Q1 back to the multi-write FIFO buffer 360. Thus, the token list from head to tail is Q5-Q1. Further, the multi-write FIFO buffer 360 outputs the token Q5 in response to a read access to the multi-write FIFO buffer 360. In response to the output token Q5, the packet queue Q5 provides a packet to the network port 311 for transmitting out of the network device 300. Then, the packet queue Q1 has one packet, the packet queue Q2 has no packet, the packet queue Q3 has no packet, the packet queue Q4 has no packet, and the packet queue Q5 has three packets.

At time T11, in an example, the aggregated logic circuit 340 receives the output token Q5 that was previously output at T10. Because the status of the packet queue Q5 is still non-empty, the aggregated logic circuit 340 writes the token Q5 back to the multi-write FIFO buffer 360. Thus, the token list from head to tail is Q1-Q5. Further, the multi-write FIFO buffer 360 outputs the token Q1 in response to a read access to the multi-write FIFO buffer 360. In response to the output token Q1, the packet queue Q1 provides a packet to the network port 311 for transmitting out of the network device 300. Then, the packet queue Q1 has no packet, the packet queue Q2 has no packet, the packet queue Q3 has no packet, the packet queue Q4 has no packet, and the packet queue Q5 has three packets.

At time T12, in an example, the aggregated logic circuit 340 receives the output token Q1 that was previously output at T11. Because the status of the packet queue Q1 is changed to empty (the four packets in the packet Queue Q1 have been transmitted), the aggregated logic circuit 340 discards the token Q1 without writing back to the multi-write FIFO buffer 360. Thus, the token list from head to tail is Q5. Further, the multi-write FIFO buffer 360 outputs the token Q5 in response to a read access to the multi-write FIFO buffer 360. In response to the output token Q5, the packet queue Q5 provides a packet to the network port 311 for transmitting out of the network device 300. Then, the packet queue Q1 has no packet, the packet queue Q2 has no packet, the packet queue Q3 has no packet, the packet queue Q4 has no packet, and the packet queue Q5 has two packets.

At time T13, in an example, the aggregated logic circuit 340 receives the output token Q5 that was previously output at T12. Because the status of the packet queue Q5 is still non-empty, the aggregated logic circuit 340 writes the token Q5 back to the multi-write FIFO buffer 360. Thus, the token list from head to tail is Q5. Further, the multi-write FIFO buffer 360 outputs the token Q5 in response to a read access to the multi-write FIFO buffer 360. In response to the output token Q5, the packet queue Q5 provides a packet to the network port 311 for transmitting out of the network device 300. Then, the packet queue Q1 has no packet, the packet queue Q2 has no packet, the packet queue Q3 has no packet, the packet queue Q4 has no packet, and the packet queue Q5 has one packet.

At time T14, in an example, the aggregated logic circuit 340 receives the output token Q5 that was previously output at T13. Because the status of the packet queue Q5 is still non-empty, the aggregated logic circuit 340 writes the token Q5 back to the multi-write FIFO buffer 360. Thus, the token list from head to tail is Q5. Further, the multi-write FIFO buffer 360 outputs the token Q5 in response to a read access to the multi-write FIFO buffer 360. In response to the output token Q5, the packet queue Q5 provides a packet to the network port 311 for transmitting out of the network device 300. Then, the packet queue Q1 has no packet, the packet queue Q2 has no packet, the packet queue Q3 has no packet, the packet queue Q4 has no packet, and the packet queue Q5 has no packet.

At time T15, in an example, the aggregated logic circuit 340 receives the output token Q5 that was previously output at T14. Because the status of the packet queue Q5 is changed to empty (the five packets queued in the packet queue Q5 have been transmitted output of the network device 300), the aggregated logic circuit 340 discard the token Q5 without writing back to the multi-write FIFO buffer 360. Thus, the token list is empty.

It is noted that in the FIG. 4 example, the packet queue Q5 is allocated with transmission opportunity in consecutive cycles from time T12 to time T14.

Figure 5:
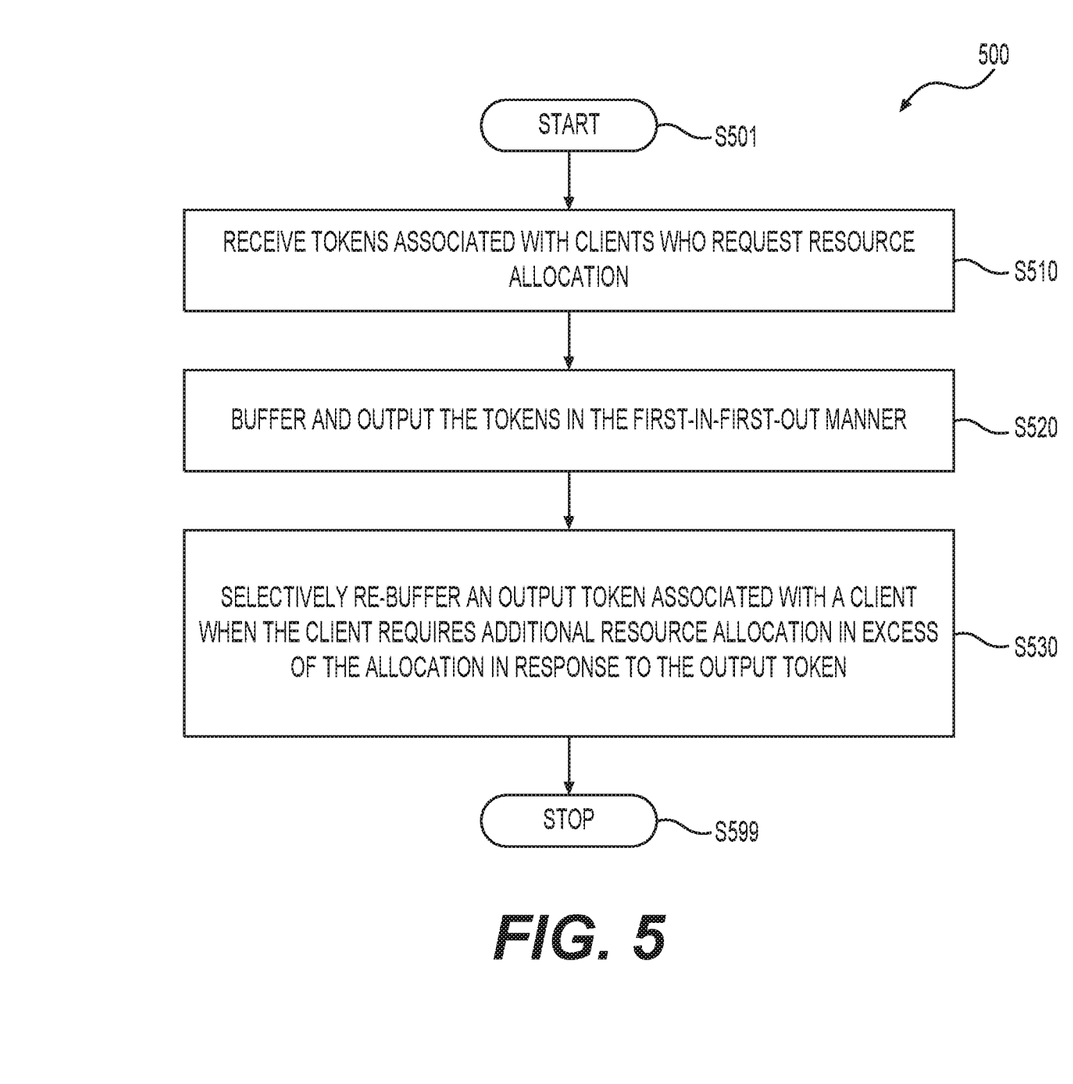
FIG. 5 shows a flow chart outlining a process example 500 that is used in the resource allocation system 100 according to some embodiment of the disclosure.

FIG. 5 shows a flow chart outlining a process example 500 according to some embodiment of the disclosure. The process is executed by a FIFO selection circuit in a resource allocation system, such as the FIFO selection circuit 130 in the resource allocation system 100, the FIFO selection circuit 230 in the network device 200 and the FIFO selection circuit 330 in the network device 300. The process starts at 5501 and proceeds to 5510.

At 5510, tokens associated with clients who request resource allocation are received. In an example, a token is newly generated when the status of a packet queue changes from empty to non-empty.

At 5520, the tokens are buffered and output in the first-in-first-out manner. In some example, a multi-write FIFO buffer is used to buffer and output the tokens in a token list having tail and head in the first-in-first-out manner. The multi-write FIFO buffer is able to take multiple input tokens in a clock cycle, and add the multiple input tokens after the tail of the token list. Further, in the clock cycle, the multi-write FIFO buffer is able to output a token that is removed from the head of the token list in response to a read access in the clock cycle. Then, in response to the output token, the resource is allocated to the client associated with the output token for a time slice in an example.

At 5530, an output token is selectively re-buffered. For example, when the client associated with the output token requires additional resource allocation in excess of the allocation in response to the output token, then the output token is re-buffered into the multi-write FIFO buffer. When the client associated with the output token requests no additional resource allocation, the output token is discarded without re-buffering in an example. Then, the process proceeds to 5599 and terminates.

Figure 6:
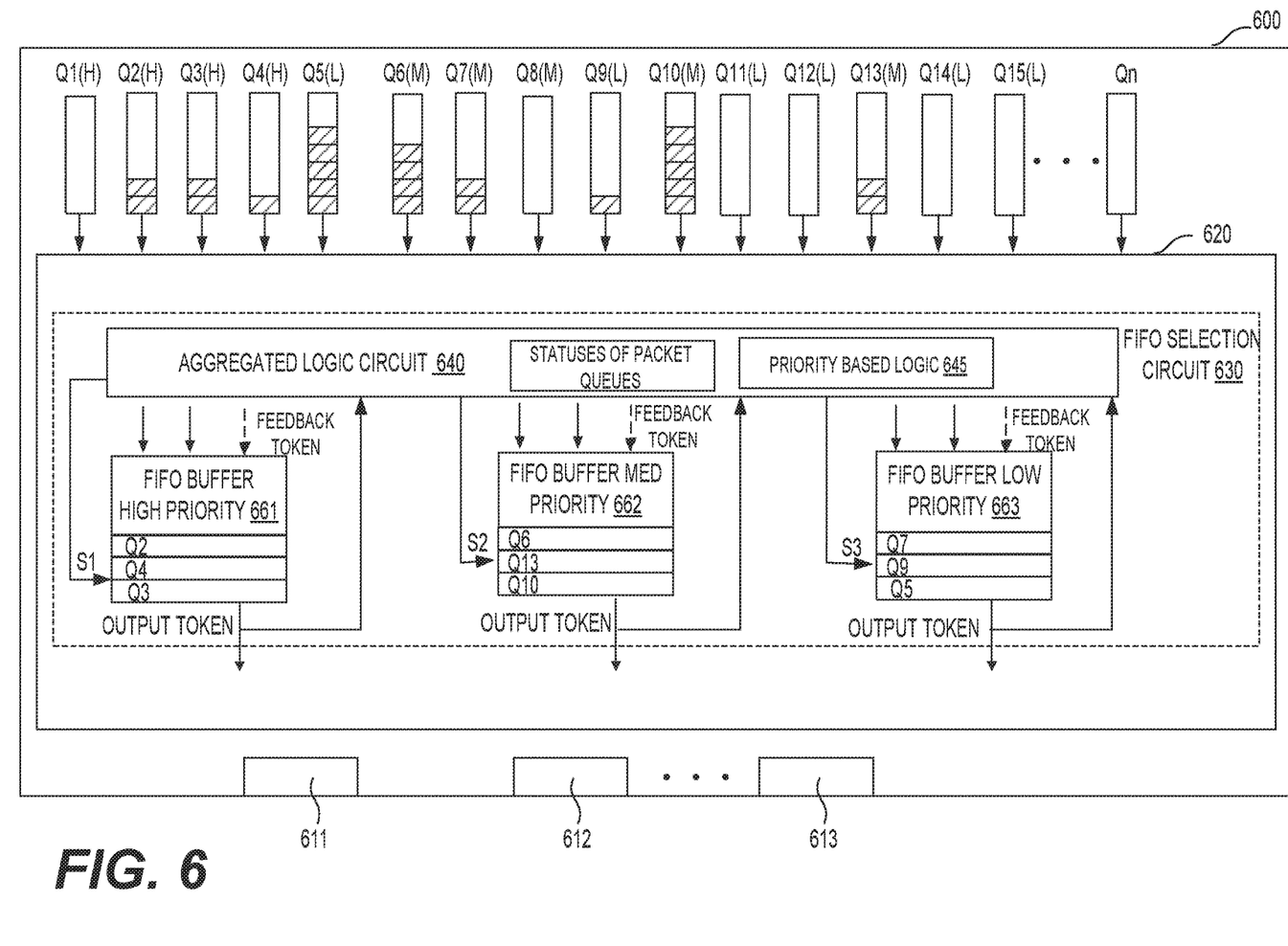
FIG. 6 shows a block diagram of another network device 600 as an implementation of the resource allocation system 100 according to an embodiment of the disclosure.

FIG. 6 shows a block diagram of another network device 600 as an implementation of the resource allocation system 100 according to an embodiment of the disclosure. The network device 600 includes an arbitrator 620 configured to manage allocation of network transmission resource to a plurality of packet queues Q1-Qn. The arbitrator 620 is based on a combination of a FIFO scheduling technique to implement a pseudo round robin (RR) algorithm and a priority based scheduling technique.

The network device 600 utilizes certain components that are identical or equivalent to those used in the network device 300 and the network device 200; the description of these components has been provided above and will be omitted here for clarity purposes. For example, the network ports 611-613 are identical or equivalent to the network ports 211-213 (or network ports 311-313); the packet queues Q1-Qn in FIG. 6 are identical or equivalent to the packet queues Q1-Qn in FIG. 2 (or in FIG. 3).

In the FIG. 6 example, the packet queues Q1-Qn are configured to queue packets according to priority levels. For example, packet queues Q1, Q2, Q3 and Q4 are configured to queue packets of a high priority level (represented by H); packet queues Q6, Q7, Q8, Q10 and Q13 are configured to queue packets of a medium priority level (represented by M); and packet queues Q5, Q9, Q11, Q12, Q14, and Q15 are configured to queue packets of a low priority level (represented by L).

In the FIG. 6 example, the arbiter 620 includes a FIFO selection circuit 630, and the FIFO selection circuit 630 includes a plurality of multi-write FIFO buffers 661-663 that are respectively identical or equivalent to the multi-write FIFO buffer 260 (or the multi-write FIFO buffer 360). The plurality of multi-write FIFO buffers 661-663 are respectively configured to implement the FIFO based RR algorithm for different priority levels. For example, the multi-write FIFO buffer 661 is configured to implement the FIFO based RR algorithm for queues of the high priority level; the multi-write FIFO buffer 662 is configured to implement the FIFO based RR algorithm for queues of the medium priority level; the multi-write FIFO buffer 663 buffers is configured to implement the FIFO based RR algorithm for queues of the low priority level.

Further, in the FIG. 6 example, the FIFO selection circuit 630 includes an aggregated logic circuit 640 that includes any suitable supporting logic circuits between the plurality of multi-write FIFO buffers 661-663 and the packet queues Q1-Qn to enable the arbiter operation according to the priority levels and the FIFO based RR algorithm. For example, aggregated logic circuit 640 includes similar logics as the aggregated logic circuit 340, and additionally includes priority based logic 645 that performs operations based on priority levels.

In some embodiments, the aggregated logic circuit 640 is configured to generate a new token associated with a queue in response to a request (e.g., a status change from empty to non-empty) of the queue, and then provide the new token to one of the multi-write FIFO buffer 661-663 according to the priority level of the queue. For example, when the aggregated logic circuit 640 receives a request from the queue Q2 that has the high priority level, the aggregated logic circuit 640 generates a new token associated with the queue Q2, and writes the new token associated with the queue Q2 into the multi-write FIFO buffer 661. When the aggregated logic circuit 640 receives a request from the queue Q10 that has the medium priority level, the aggregated logic circuit 640 generates a new token associated with the queue Q10, and writes the new token associated with the queue Q10 into the multi-write FIFO buffer 662. When the aggregated logic circuit 640 receives a request from the queue Q5 that has the low priority level, the aggregated request logic circuit 640 generates a new token associated with the queue Q5, and writes the new token associated with the queue Q5 into the multi-write FIFO buffer 663.

Further, in some embodiments, at each cycle (e.g., clock cycle, servicing cycle, transmission cycle . . . ), the aggregated logic circuit 640 selects one of the multi-write FIFO buffers 661-663 according to a priority based arbitration algorithm, and generates control signals S1-S3 accordingly. The control signals S1-S3 are provided respectively to the multi-write FIFO buffers 661-663, control the selected multi-write FIFO buffer to output a token, and control the other multi-write FIFO buffers to halt outputting tokens.

In an example, at a clock cycle, the aggregated logic circuit 640 determines, according to the priority arbitration algorithm, an allocation of the transmission resource to one of high priority queues, the aggregated logic circuit 640 generates the control signals S1-S3 to control the multi-write FIFO buffer 661 to output a token, and to halt the multi-write FIFO buffers 662-663 for outputting tokens.

It is noted that any suitable priority based arbitration algorithm can be implemented in the aggregated logic circuit 640.

Figure 7:
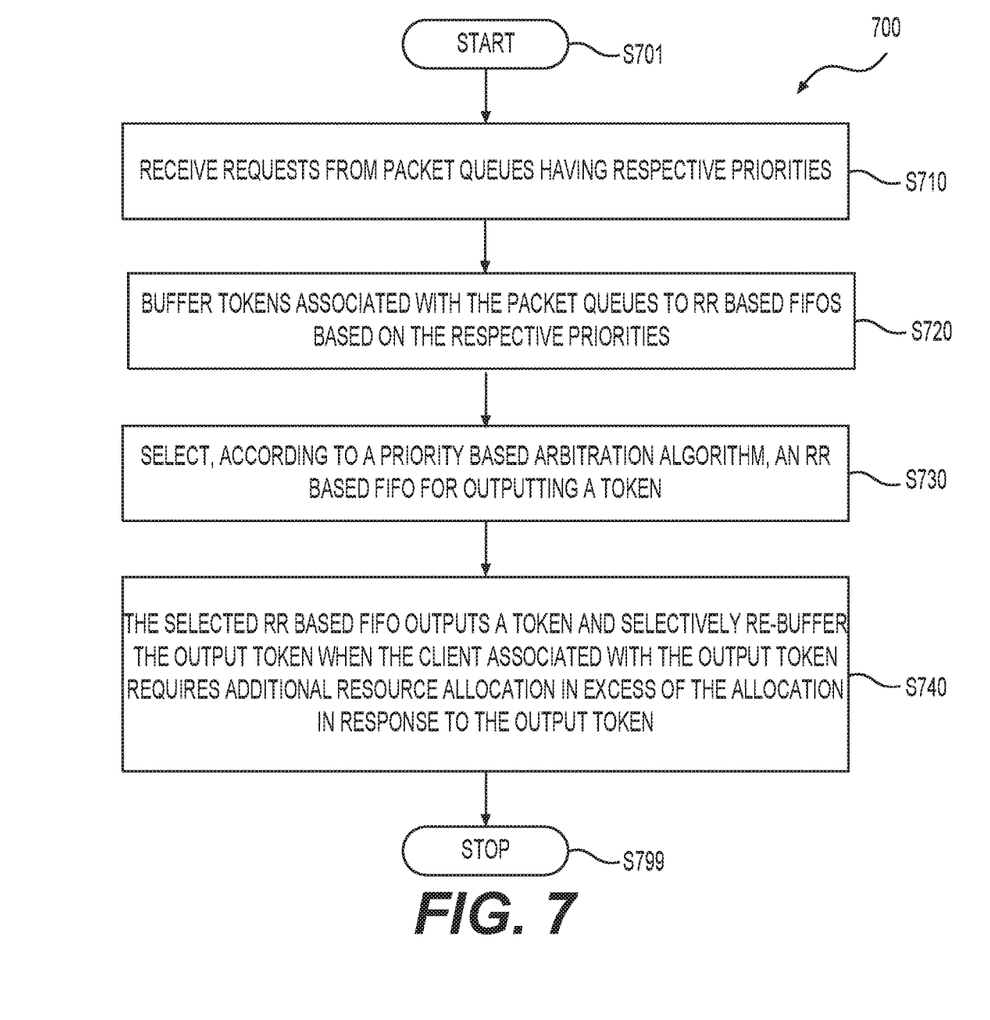
FIG. 7 shows a flow chart outlining a process 700 that is used in the network device 600 according to an embodiment of the disclosure.

FIG. 7 shows a flow chart outlining a process 700 that is used in the network device 600 according to an embodiment of the disclosure. The process is executed by the FIFO selection circuit 630. The process starts at 5701 and proceeds to 5710.

At 5710, tokens associated with packet queues are received. In an example, a token is newly generated when the status of a packet queue changes from empty to non-empty.

At 5720, the tokens are respectively buffered into RR based FIFO buffers having different priorities based on respective priorities of the packet queues. In an example, when a new token is associated with a queue having the high priority level, the new token is written to the multi-write FIFO buffer 661; when a new token is associated with a queue having the medium priority level, the new token is written to the multi-write FIFO buffer 662; and when a new token is associated with a queue having the low priority level, the new token is written to the multi-write FIFO buffer 663.

At 5730, one of the RR based FIFO buffers is selected in each servicing cycle based on a priority based arbitration algorithm. For example, at each cycle (e.g., clock cycle, servicing cycle, transmission cycle . . . ), the aggregated logic circuit 640 selects one of the multi-write FIFO buffers 661-663 according to a priority based arbitration algorithm, and generates control signals to control the multi-write FIFO buffers 661-663 accordingly.

At 5740, the selected RR based FIFO buffer outputs a token, and the output token is selectively re-buffered. For example, when the queue associated with the output token is not empty after a packet transmission in response to the output token, then the output token is re-buffered into the selected multi-write FIFO buffer. When the queue associated with the output token is empty after the packet transmission in response to the output token, the output token is discarded without re-buffering in an example. Then, the process proceeds to 5799 and terminates.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A network device, comprising:
   a plurality of queues that respectively queue packets for processing, the plurality of queues including a first queue;
   functional circuitry configured to provide a processing resource to be shared by the plurality of queues for processing the packets in the plurality of queues; and
   a first-in-first-out (FIFO) selection circuit configured to:
      receive tokens respectively associated with the plurality of queues, a token associated with a queue being indicative of a selection of the queue for providing a packet to be processed by the functional circuitry when the token is output by the FIFO selection circuit, and
      store the tokens in a buffer and output the tokens from the buffer in a first-in-first-out manner,
      store respective queue status information within respective to tokens, each queue status information regarding respective status of the respective queue associated with the respective token, and
      in response to determining that first queue status information in a first token output from the buffer indicates that a first queue stores one or more additional packets, re-store the first token in the buffer to permit the first queue to output another packet in connection with the first token again being output from the buffer.

2. The network device of claim 1, wherein the FIFO selection circuit comprises:
   a multi-write FIFO buffer configured to, in a clock cycle, receive multiple input tokens and add the multiple input tokens into a token list, stored in the buffer, after a tail of the token list.

3. The network device of claim 2, wherein:
   the multi-write FIFO buffer is configured to, in the clock cycle, remove the first token from a head of the token list in the buffer and output the first token in response to a read access to the multi-write FIFO buffer.

4. The network device of claim 1, wherein the FIFO selection circuit comprises: a logic circuit configured to generate the first token associated with the first queue in response to a request from the first queue for requesting the processing resource.

5. The network device of claim 4, wherein the logic circuit is further configured to update the first queue status information in the first token in response to outputting the first token.

6. The network device of claim 5, wherein the logic circuit is configured to:
   determine, based on the first queue status information regarding the first queue, whether the output of a first packet in response to outputting the first token fulfills the request from the first queue associated with the first token; and
   re-store the first token in the buffer when the output of the first packet in response to outputting the first token fails to fulfill the request from the first queue associated with the first token.

7. The network device of claim 1, wherein the FIFO selection circuit comprises:
   a logic circuit configured to monitor the queues, and generate the first token associated with the first queue in response to a status of the first queue changing from empty to non-empty.

8. The network device of claim 7, wherein the logic circuit is configured to:
   determine, based on the first queue status information regarding the first queue, whether the first queue changes the first queue status information to indicate the first queue is empty after the first queue outputs a first packet in response to outputting the first token, wherein the first queue status information regarding the first queue is stored in the first token; and
   re-store the first token when the first queue remains non-empty after the first queue outputs the first packet in response to outputting the first token.

9. The network device of claim 1, wherein the FIFO selection circuit comprises:
   a plurality of FIFO buffers of different priority levels; and
   a logic circuit configured to:
      write the first token associated with the first queue to one of the FIFO buffers that matches a priority of the first queue, and
      select the one of the FIFO buffers to output the first token in a cycle according a priority based arbitration algorithm.

10. A method for packet processing in a network device, the method comprising:
    queuing packets in a plurality of queues that share a processing resource for packet processing, the plurality of queues including a first queue;
    generating tokens respectively associated with the queues when the queues change from empty to non-empty;
    storing tokens in a buffer and outputting the tokens from the buffer in a first-in-first-out manner;
    storing respective queue status information within respective tokens, each queue status information regarding respective status of the respective queue associated with the respective token;
    in response to outputting a first token associated with the first queue, outputting from the first queue a first packet for processing by the processing resource; and
    in response to determining that first queue status information in the first token that was output from the buffer indicates that the first queue stores one or more additional packets, re-store the first token to permit the first queue to output another packet in connection with the first token again being output from the buffer.

11. The method of claim 10, further comprising:
    storing, in a clock cycle, multiple input tokens at a tail position in the buffer.

12. The method of claim 11, further comprising:
    removing, in the clock cycle and in response to a read access to the buffer, the first token from a head position in the buffer.

13. The method of claim 10, further comprising:
generating the first token associated with the first queue in response to a request from the first queue for requesting the processing resource.

14. The method of claim 10, further comprising:
updating the first queue status information in the first token in response to outputting the first token.

15. The method of claim 14, further comprising:
determining, based on the first queue status information regarding the first queue, whether the output of the first packet in response to outputting the first token fulfills the request from the first queue associated with the first token; and
wherein re-storing the first token comprises re-storing the first token into the buffer when the output of the first packet in response to outputting the first token fails to fulfill the request from the first queue associated with the output token.

16. The method of claim 10, further comprising:
monitoring the plurality of queues; and
generating the first token associated with the first queue in response to a status of the first queue changing from empty to non-empty.

17. The method of claim 16, further comprising:
determining, based on the first queue status information regarding the first queue, whether the first queue changes the status to empty after the first queue outputs the first packet in response to outputting the first token, wherein the first queue status information regarding the first queue is stored in the first token; and
wherein re-storing the first token comprises re-storing the first token into the buffer when the first queue remains non-empty after the first queue outputs the first packet in response to outputting the first token.

18. The method of claim 10, further comprising:
buffering the tokens to a plurality of buffers of different priority levels; and
selecting one of the buffers to output the first token in a cycle according to a priority based arbitration algorithm.

19. A resource arbiter for scheduling allocation of a shared resource for serving a plurality of client devices, the resource arbiter comprising:
a first-in-first-out (FIFO) selection circuit configured to:
receive tokens respectively associated with the plurality of client devices which request the shared resource, a token associated with a client device being indicative of an allocation of the shared resource to the client device when the token is output by the FIFO selection circuit, and
store the tokens in a buffer and output the tokens from the buffer in a first-in-first-out manner,
store respective queue status information within respective tokens, each queue status information regarding respective status of the respective queue associated with the respective token, and
in response to determining that first queue status information in a first token output from the buffer indicates that a first client device requires an additional resource allocation of the shared resource in excess of an allocation of the shared resource to the first client device as indicated by outputting of the first token from the buffer, re-store the first token in the buffer to permit the first client device to receive the additional resource allocation of the shared resource in connection with the first token again being output from the buffer.

20. The resource arbiter of claim 19, wherein the FIFO selection circuit comprises:
a plurality of FIFO buffers of different priority levels; and
a logic circuit configured to:
write the first token associated with the first client device to one of the FIFO buffers that matches a priority of the first client device, and
select the one of the FIFO buffers to output the first token in a cycle according a priority based arbitration algorithm.

\* \* \* \* \*